US012344368B2

(12) United States Patent
Wilson (10) Patent No.: US 12,344,368 B2
(45) Date of Patent: Jul. 1, 2025

(54) AIRCRAFT NOSE LANDING GEAR ASSEMBLY

(71) Applicant: AIRBUS OPERATIONS LIMITED, Bristol (GB)

(72) Inventor: Fraser Wilson, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 0 days.

(21) Appl. No.: 18/128,808

(22) Filed: Mar. 30, 2023

(65) Prior Publication Data
US 2023/0312087 A1  Oct. 5, 2023

(30) Foreign Application Priority Data

Mar. 31, 2022 (GB) ..................................... 2204717

(51) Int. Cl.
*B64C 25/36* (2006.01)
*B60L 7/10* (2006.01)
(Continued)

(52) U.S. Cl.
CPC ............... *B64C 25/36* (2013.01); *B60L 7/10* (2013.01); *B60T 8/1703* (2013.01);
(Continued)

(58) Field of Classification Search
CPC ...... B64C 25/405; B64C 25/426; B64C 25/48
See application file for complete search history.

(56) References Cited

U.S. PATENT DOCUMENTS 8,403,259 B2 * 3/2013 Charuel ................ B64C 25/405
244/50
8,474,749 B2 * 7/2013 Cros ..................... B64C 25/405
244/50
(Continued)

FOREIGN PATENT DOCUMENTS

GB     2 471 213 A    12/2010
WO   2012/106643      8/2012

OTHER PUBLICATIONS

B-29 Nose Gear—International Bomber Command Centre Digital Archive, accessed at <https://ibccdigitalarchive.lincoln.ac.uk/omeka/collections/document/15847>, 3 pages, Mar. 15, 2023.
(Continued)

*Primary Examiner* — Richard Green
(74) *Attorney, Agent, or Firm* — Nixon & Vanderhye P.C.

(57) ABSTRACT

An aircraft nose landing gear assembly is disclosed including two wheels, motors, brakes, and a controller. The wheels are separated by a steering axis and independently rotatable about a rotation axis in a rotation direction. The motors and brakes are each arranged to selectively engage a respective wheel. The motors and brakes supplement and resist rotation of the respective wheel in the rotation direction, respectively. On the basis of an indication to the controller of rotation of the two wheels in the rotation direction, the controller is arranged to: cause one motor to engage its respective wheel and supplement rotation, and cause the brake associated with the other wheel to engage the other wheel and resist rotation. Engagement of the motor and brake causes the wheels to pivot about the steering axis during a turning event.

17 Claims, 3 Drawing Sheets

(51) Int. Cl.
*B60T 8/17* (2006.01)
*B64C 25/32* (2006.01)
*B64C 25/48* (2006.01)
*B64C 25/50* (2006.01)

(52) U.S. Cl.
CPC ............ *B64C 25/405* (2013.01); *B64C 25/48* (2013.01); *B64C 25/50* (2013.01); *B60T 2260/02* (2013.01); *B60T 2270/60* (2013.01)

(56) References Cited

U.S. PATENT DOCUMENTS

| | | | |
|---|---|---|---|
| 9,121,487 B2 | 9/2015 | De Mers et al. | |
| 10,220,940 B2 * | 3/2019 | Guery | B64C 25/405 |
| 10,442,529 B2 * | 10/2019 | Dupre | B64C 25/48 |
| 11,557,988 B2 * | 1/2023 | Ribarov | B64C 25/405 |
| 11,713,777 B2 * | 8/2023 | Sadler | B64C 25/405 60/325 |
| 12,084,192 B2 * | 9/2024 | Beaucamp | B64C 25/426 |
| 2005/0224642 A1 | 10/2005 | Sullivan | |
| 2007/0282491 A1 * | 12/2007 | Cox | B64C 25/40 244/76 R |
| 2009/0218440 A1 | 9/2009 | Dilmaghani et al. | |
| 2010/0217456 A1 | 8/2010 | Edelson et al. | |
| 2013/0264414 A1 | 10/2013 | Ribarov et al. | |
| 2016/0311525 A1 | 10/2016 | Wilson et al. | |
| 2016/0318604 A1 | 11/2016 | Guery et al. | |
| 2017/0008503 A1 | 1/2017 | Romana et al. | |
| 2018/0170527 A1 | 6/2018 | Roques et al. | |
| 2023/0322371 A1 * | 10/2023 | Hill | B64C 25/405 244/102 A |

OTHER PUBLICATIONS

Ingeniería Y Mecánica Automotriz, "Steering System: Requirements, Types, Power Steer" accessed at <https//www.ingenieriaymecanicaautomotriz.com>, 13 pages, dated Aug. 5, 2019.

Toyota Motor Corporation, "New Dynamic Torque Vectoring AWD and E-Four 4WD Systems", Toyota's New Powertrain, TNGA, Toyota Motor Corporation Official Global Website, 7 pages, dated Feb. 26, 2018.

Yong Li et al., "GA-BPNN Based Hybrid Steering Control Approach for Unmanned Driving Electric Vehicle with In-Wheel Motors", Hindawi Research Article, vol. 2018, Article ID 6132139, 33 pages, published Nov. 13, 2018, <https://doi.org/10.1155/2018/6132139>.

Search Report for Application No. GB2204717.9, 1 page, dated Sep. 21, 2022.

Extended European Search Report for Application No. EP 23165182.9, ten pages, dated Aug. 1, 2023.

* cited by examiner

AIRCRAFT NOSE LANDING GEAR ASSEMBLY

CROSS RELATED APPLICATION

This application claims priority to United Kingdom Patent Application GB 2204717.9, filed Mar. 31, 2022, the entire contents of which is hereby incorporated by reference.

BACKGROUND OF THE INVENTION

The present disclosure relates to an aircraft nose landing gear assembly. More particularly, but not exclusively, this invention concerns an aircraft nose landing gear assembly comprising a controller to engage a motor and brake with a respective wheel each spaced from a steering axis to respectively supplement or resist wheel rotation and pivot the wheels about the steering axis. The invention also concerns an aircraft comprising the aircraft nose landing gear assembly, and a method of operating an aircraft nose landing gear assembly during a turning event.

An aircraft nose landing gear assembly typically comprises one or more nosewheels that is/are steerable to help manoeuvre an aircraft while taxiing. In some applications, the steerable wheel operates as a castor and turns in reaction to external unbalanced forces acting on the aircraft. In one example, the unbalanced forces comprise a thrust differential, whereby thrust from one of a port or starboard side propulsion device, such as an engine, is greater than the other propulsion device. A forward thrust differential, for example, urges the aircraft in a forward direction that is biased to the propulsion device on the side generating a lower thrust and the steerable wheel responds by turning in the same direction. A slip angle of the wheel is produced when the wheel turns, which is the angle between a direction in which a wheel is pointing and a direction in which it is actually traveling. During a typical taxiing manoeuvre, the aircraft will turn multiple times, which requires multiple changes in the thrust differential, for example. Furthermore, a propulsion device typically operates outside of its optimum operating window when taxiing because the propulsion device is optimised for use in-flight and frequent adjustments to the thrust differential can generate noise by cyclically loading the propulsion device.

The present invention seeks to mitigate the above-mentioned problems. Alternatively or additionally, the present invention seeks to provide an improved aircraft nose landing gear assembly and/or improved method of operating an aircraft nose landing gear assembly during a turning event.

SUMMARY OF THE INVENTION

The present invention provides, according to a first aspect, an aircraft nose landing gear assembly. The assembly may comprise two wheels. The wheels may be separated by a steering axis of the aircraft nose landing gear assembly. Each wheel may be independently rotatable about a rotation axis in a rotation (forward or reverse) direction. The assembly may comprise two motors. Each motor may be arranged to selectively engage and supplement rotation of a respective wheel in the rotation direction. The assembly may comprise two brakes. Each brake may be arranged to selectively engage and resist rotation of a respective wheel in the rotation direction. The assembly may comprise a controller. The controller may be arranged to, on the basis of an indication to the controller of rotation of the two wheels in the rotation direction, cause one motor to engage its respective wheel and supplement rotation, and the brake associated with the other wheel to engage the other wheel and resist rotation, such that said engagement of the motor and brake causes the wheels to pivot about the steering axis during a turning event.

Aircraft nose landing gear assemblies, in accordance with the present invention, may provide a steering function that is separate to a propulsion function by locally steering the nosewheels independent of an aircraft's main propulsion system for propelling the aircraft when taxiing and/or when in-flight. Such assemblies may reduce an energy requirement from the main propulsion system when taxiing. Additionally or alternatively, such assemblies may provide for more efficient operation of the main propulsion system by separating the steering and propulsion functions.

The term "wheel" of the aircraft nose landing gear assembly is used here in its conventional sense to refer to a ground wheel, which contacts the ground surface when the aircraft is supported by the ground and is not airborne. The term "motor" is used here in its conventional sense to refer to a machine, whereby some source of energy (for example, electric, pneumatic, hydraulic, and so on) is used to give motion.

The aircraft nose landing gear assembly may comprise a steering post coupled to the wheels. A longitudinal axis of the steering post may be parallel to the steering axis. The steering axis may be an upright axis of rotation of the aircraft nose landing gear assembly about which the aircraft nose landing gear assembly rotates. The steering post may be coupled to a torsional damper. The torsional damper may be coaxial with the steering post. The torsional damper may be coupled to the steering post by one or more fasteners.

Each wheel may be coupled to an axle. A longitudinal axis of the axle may be parallel to the rotation axis. The wheels may be coupled to the same axle. The axle(s) may be coupled to the steering post. The axle may be coupled to the steering post via a torsional damper. The torsional damper may be coaxial with the axle. The torsional damper may be coupled to the axle by one or more fasteners. Each wheel may be free to castor when off the ground and/or when the motor and brake are disengaged. Each wheel may be pivotally coupled about the steering axis and/or steering post. Each wheel may pivot proportionally about the steering axis and/or steering post.

Each motor may be an electric motor. The electric motor may be controlled by electrical signals from the controller. Each electric motor may comprise a stator and a rotor. The rotor and stator may rotate about a common axis. The common axis may be parallel or correspond to the rotation axis of the wheel. Each motor may be coupled to the axle. Each motor may be an in-wheel motor. Each motor may be installed in the wheel of the aircraft nose landing gear assembly. Each motor may be provided in an internal region of the wheel. Beneficially, the steering system has a low impact on drag when the aircraft nose landing gear assembly is deployed from an aircraft before landing.

Each motor may be configured to engage and disengage with the respective wheel. When disengaged, the wheel may not be driven (undriven) by the motor. When disengaged, the respective wheel may be free to rotate. When disengaged, the wheels may be free to pivot. Each motor may supplement rotation by providing a driving torque to the respective wheel. The driving torque may be provided additionally to a driving force for driving the respective wheel forward or in reverse by an energy source that is separate from the motor.

Each brake may be an electric brake. The electric brake may be controlled by electrical signals from the controller. Each brake may be coupled to the axle. Each brake may be configured to engage and disengage with the respective wheel. Each brake may resist rotation by providing a braking or retarding torque to the respective wheel. The braking or retarding torque may not cause the wheel to rotate. The braking or retarding torque may cause the wheel to stop. The braking or retarding torque may prevent the wheel rotating in the direction opposite to the direction of rotation. The braking or retarding torque may not be able to drive the wheel. The braking or retarding torque may not be able to drive the wheel in a direction opposite to a direction of rotation caused by the motor. Each brake may be for resisting rotation of a respective wheel and may not be configured to cause rotation of that wheel.

The indication to the controller may comprise a signal from a sensor. The sensor may be a wheel speed sensor. The indication to the controller may comprise an indication about a rotational speed of the wheel. The sensor may be a ground speed sensor. The indication to the controller may comprise an indication about a ground speed of the aircraft nose landing gear assembly. The indication to the controller may comprise an indication that the rotation of the two wheels in the rotation direction are along flat and level ground.

The rotation direction may be a forward and/or reverse direction. Rotation of the wheels may be caused by an energy input that is external to the motor, for example by gravitational force or a thrust force from a separate propulsion device.

The aircraft nose landing gear assembly may comprise two electromotive devices. Each electromotive device may be associated with one of the two wheels and selectively operable by the controller as one of the motors or one of the brakes. When operated as one of the brakes, the electromotive device may operate as a generator and generate electricity. The electromotive devices may be controlled by electrical signals from the controller. Each electromotive device may comprise a stator and a rotor. The rotor and stator may rotate about a common axis. The common axis may be parallel or correspond to the rotation axis of the wheel. Each electromotive device may be an in-wheel. Each electromotive device may be installed in the wheel of the aircraft nose landing gear assembly. Each electromotive device may be provided in an internal region of the wheel. Each electromotive device may be configured to engage and disengage with the respective wheel. Each electromotive device, when operable as a motor, may supplement rotation by providing a driving torque to the respective wheel. The driving torque may be provided additional to a driving force for driving the respective wheel forward or in reverse by an energy source that is separate from the electromotive device.

The controller may be arranged to cause at least a portion of an energy demand by the motor to supplement rotation to be provided by energy recovered by the brake to resist rotation. Beneficially, the steering function can be energy efficient by utilising braking energy through regenerative braking on one (an inner) side of the steering axis of the aircraft nose landing gear assembly. The energy demand may comprise an amount of energy to be supplied to the motor. The energy recovered may comprise an amount of energy generated by the brake under braking. One of the electromotive devices may be at least partially powered by another one of the electromotive devices. This allows the electromotive device operable as a motor to have a minimal power draw to enable operation during ground movement of an aircraft (for example when taxiing). Beneficially, the controller provides for improved energy management of the steering function. The controller may be arranged to cause most of the energy demand to be provided by the energy recovered. More than half of an energy requirement of each electromotive device (when operable as a motor) may be at least partially powered by each electromotive device (when operable as a brake). At least 75% or 90% of the energy demand by the motor to supplement rotation may be provided by energy recovered by the brake to resist rotation. The controller may be arranged to cause the energy demand to be provided by the energy recovered during the same turning event. A turning event may comprise adjusting or holding a slip angle of a wheel. The energy demand may be a maximum allowable energy demand.

The aircraft nose landing gear assembly may comprise an energy storage to store the energy recovered as stored energy. The controller may be arranged to cause the energy demand during the turning event or a subsequent turning event to be provided by the stored energy. The energy storage may comprise a battery or a capacitor. Electrical energy may be released by the energy storage on receipt of a signal from the controller indicating that the motor requires energy to supplement rotation of the wheel.

According to a second aspect of the invention, an aircraft comprising the aircraft nose landing gear assembly according to the first aspect or any other aspect is provided.

Each motor of the nose landing gear assembly may be rated to change a ground (forward or reverse) speed of the aircraft by no more than 5 knots or 10 knots when the motor is selectively engaged. The rating of each motor may be power rating, for example a maximum power output. The rating of each motor may be an energy rating, for example a maximum energy output. Each motor may have a maximum power output of no more than 50 kW, 75 kW or 100 kW, for example when the aircraft is a commercial aircraft. The combined maximum energy and/or power output of the motors may be insufficient to cause the aircraft to taxi at a threshold taxiing speed. The threshold taxiing speed may be at least 5 knots, 10 knots, 15 knots, or 20 knots.

The aircraft may comprise a main propulsion system for propelling the aircraft when taxiing and/or when in-flight. The aircraft may comprise a plurality of main propulsion systems for propelling the aircraft when taxiing. The controller may be configured to cause a maximum energy demand by each motor to supplement the rotation of its respective wheel that is less than (for example, no more than half of) an amount of energy required to propel the aircraft by the main propulsion system when taxiing. The main propulsion system may comprise at least one engine. The at least one engine may be mounted on each wing of two wings of the aircraft. The main propulsion system may be located away from landing gear of the aircraft, for example the nose landing gear assembly. The combined maximum power output of the motors of the nose landing gear assembly may be less than 20% (optionally, less than 10%) of the maximum energy and/or power needed by the main propulsion system to cause the aircraft to taxi along the ground at a threshold taxiing speed.

The aircraft may comprise an energy storage to store energy recovered by the brake when resisting rotation as stored energy. The energy storage may be located away from the nose landing gear assembly. The energy storage may comprise a battery or a capacitor.

The aircraft may be a commercial passenger aircraft, for example an aircraft configurable to carry more than fifty passengers, for example more than one hundred passengers.

It may be that the aircraft is a fixed wing aircraft. It may be that the nose landing gear assembly is a retractable landing gear. Those skilled in the art will realise that aircraft may be provided with further landing gear assembly in addition to the aircraft nose landing gear assembly.

According to a third aspect of the invention, a method of operating an aircraft nose landing gear assembly is provided. It may be that a port side wheel and a starboard side wheel is rotated (for example, when taxiing during a ground manoeuvre) in the same direction. During rotation of the wheels, rotation of one wheel may be supplemented by a motor engaged with said wheel, and rotation of one other wheel is resisted by a brake engaged with said other wheel in a turning event. The wheels may be pivoted about a steering axis of the aircraft nose landing gear assembly in the same direction as the motor and brake are engaged.

It may be that at least a portion of an energy demand by the motor that supplemented the rotation of the one wheel comprises an energy recovered by the brake that resisted the rotation of the other wheel. It may be that at least half or 75% of an energy demand by the motor that supplemented the rotation of the one wheel comprises an energy recovered by the brake that resisted the rotation of the other wheel.

It may be that the wheels are rotated by an energy demand that exceeds a maximum energy demand by the motor. The maximum energy demand by the motor may be no more than half of the energy demand that rotates the wheels at a taxiing speed. The maximum energy demand by the motor may be no more than 25%, 10%, or 5% of the energy demand that rotates the wheels at a taxiing speed. The energy demand may be a maximum allowable energy demand.

According to a fourth aspect of the invention, an aircraft nose landing gear assembly is provided. The assembly may comprise two independently rotatable nosewheels. Each nosewheel may be steerable about a steering axis of the aircraft nose landing gear assembly. The assembly may comprise a motor. The assembly may comprise a brake. The assembly may comprise a controller. The controller may be arranged to receive an indication of a forward or reverse movement of the nosewheels. On the basis of the indication, the controller may cause the nosewheels to pivot about the steering axis in the same direction. The controller may cause the nosewheels to pivot by engagement of the motor with an outer one of the nosewheels and providing a driving torque on the outer nosewheel. The controller may cause the nosewheels to pivot by engagement of the brake with an inner one of the nosewheels and providing a retarding torque on the inner nosewheel. The retarding torque may be arranged to hold a rotational position of the wheel rather than to cause rotation of the wheel. The retarding torque may be insufficient to cause rotation of the wheel about the rotation axis. The retarding torque may be insufficient to cause rotation of the wheel about the rotation axis in the opposite direction to the driving torque by the motor acting on the same wheel.

The driving torque may be additional to a driving force for driving the nosewheels forward or in reverse by an external energy source. The external energy source may be caused by an energy input that is external to the motor, for example by gravitational force or a thrust force from a separate propulsion device. The separate propulsion system of the aircraft may be operated when taxiing the aircraft. The separate propulsion system of the aircraft may provide over 90% or 95% of the energy required to propel the aircraft. Beneficially, the driving torque is provided separately by a dedicated steering function.

The motor may be capable of producing a maximum energy output that is insufficient to propel the aircraft to a (forward and/or reverse) taxiing speed of at least 5 knots or 10 knots. A majority of the energy required to propel the aircraft may be provided by a source that is separate from the motor. The maximum energy output of the motor may be insufficient to propel the aircraft loaded to at least 70%, 80%, or 90% of a maximum take-off weight (MTOW) to the taxiing speed.

The controller may be arranged to cause at least a portion of a braking energy that is generated by the retarding torque of the brake to be used in operation of the motor to provide the additional driving torque. The portion of the braking energy may correspond to most of the braking energy. The portion of the braking energy may correspond to at least 75% of the braking energy.

According to a fifth aspect of the invention, an aircraft is provided. The aircraft may have a maximum take-off weight of at least 10,000 kg. The aircraft may comprise a nose landing gear. The nose landing gear may comprise at least one left wheel and at least one right wheel arranged to the left and right of a steering axis of the aircraft nose landing gear assembly, respectively. The aircraft nose landing gear assembly may be mounted for rotation about the steering axis. The aircraft may comprise one or more propulsion systems separate from the nose landing gear which are arranged to propel the aircraft along the ground when taxiing. The aircraft may comprise a nose landing gear steering system comprising one or more motors arranged to provide differential driving power to the left and right wheels of the nose landing gear, the one or more motors having a combined maximum power output. The aircraft may be operable in a steering mode such that: the one or more propulsion systems deliver sufficient power to cause the aircraft to taxi along the ground and to maintain a speed that is above a threshold taxiing speed, the threshold taxiing speed being at least 10 knots; and the one or more motors of the nose landing gear steering system delivers power to at least one of the left and right wheels of the nose landing gear so as to cause a differential torque to be provided to the left and right wheels that is sufficient to enable steering of the aircraft by movement of the left and right wheels about the steering axis. The combined maximum power output of the one or more motors of the nose landing gear steering system may be insufficient to cause the aircraft to taxi along flat and level ground in a manner that would maintain a speed above the threshold taxiing speed.

In embodiments, the one or more motors are not required to contribute to the power needed to cause taxiing of the aircraft. Thus, as a result of the combined maximum power output of the one or more motors being allowed to be insufficient to cause the aircraft to taxi at the threshold taxiing speed (and being capable of being significantly lower than what would be required), the power rating of the motors may be relatively low and the motors may be relatively compact and lightweight, with the consequent advantages that those features bring, as described elsewhere herein.

The arrangement of the nose landing gear may be such that the wheels are free to caster about the steering axis of the aircraft nose landing gear assembly. There may optionally be damping of the nose landing gear despite the wheels also being free to caster.

The one or more propulsion systems may be electric motors that directly drive the wheels of other landing gear, such as the main landing gear. The one or more propulsion systems may comprise an aircraft engine, for example an engine that provides thrust during flight.

When the aircraft is turning during the steering mode, it may be that no turning torque (or other steering motion) is contributed by the one or more propulsion systems.

The one or more motors of the nose landing gear steering system may comprise a first motor dedicated to driving the left wheel and a second motor dedicated to driving the right wheel.

During the steering mode, the one or more motors of the nose landing gear steering system may remove (e.g. harness) energy and/or power from one of the left and right wheels (e.g. to provide braking). The combined maximum power output of the one or more motors of the nose landing gear steering system may be less than 20% (optionally, less than 10%) of the maximum power needed by the one or more propulsion systems to cause the aircraft to taxi along the ground at the threshold taxiing speed.

The threshold taxiing speed may be at least 15 knots or 20 knots. As mentioned above, the threshold taxiing speed may be at least 5 knots, 10 knots, 15 knots, or 20 knots. The threshold taxiing speed may be a speed in the range of 5 to 30 knots, for example 10 to 30 knots or 10 to 20 knots.

The speed of the aircraft during the steering mode may be the speed of the centre of gravity of the aircraft. It will be appreciated that the aircraft may be turning so that the direction of speed changes over time. It will also be appreciated that the speed of motion of the steering axis of the nose landing gear may have a second speed different from the aircraft speed. The left and right wheels may have speeds different from the second speed, for example, when turning one wheel may be travelling faster than the second speed and the other may be travelling slower than the second speed.

It will of course be appreciated that features described in relation to one aspect of the present invention may be incorporated into other aspects of the present invention. For example, the method of the invention may incorporate any of the features described with reference to the apparatus of the invention and vice versa. For example, any feature of the aircraft nose landing gear assembly according to the first aspect may be provided in addition to, or alternative to, any feature of the aircraft landing gear assembly according to the third aspect. Also, any feature of the aircraft according to the second aspect may be provided in addition to, or alternative to, any feature of the aircraft according to the fifth aspect.

DESCRIPTION OF THE DRAWINGS

Embodiments of the present invention will now be described by way of example only with reference to the accompanying schematic drawings of which.

DETAILED DESCRIPTION

Figure 1:
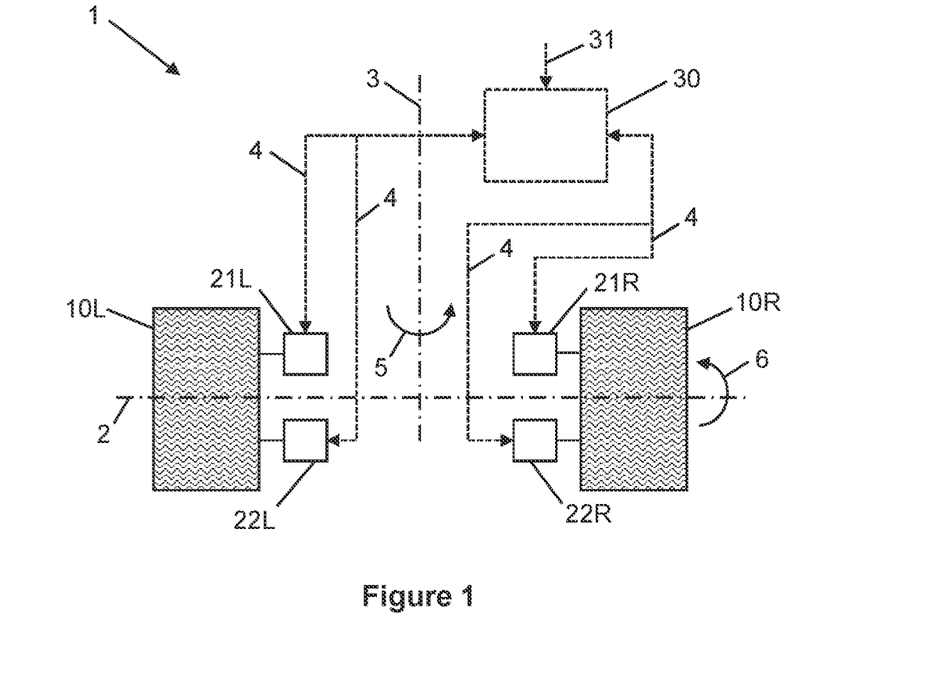
FIG. 1 shows a schematic rear view of a nose landing gear assembly according to a first embodiment of the invention.

FIG. 1 shows a schematic rear view of a nose landing gear assembly 1 for an aircraft according to a first embodiment. The assembly 1 comprises a wheel 10L for arrangement on a port side of the aircraft and a wheel 10R for arrangement on a starboard side of an aircraft. The wheels 10L, 10R are each independently rotatable about a rotation axis 2 and are spaced apart from each other along the rotation axis 2. This allows each wheel 10L, 10R to rotate about the rotation axis 2 without causing rotation of the other wheel 10L, 10R about the rotation axis 2. Independently rotatable wheels 10L, 10R allow the wheels to rotate with a differential rotational speed, such that one wheel rotates more quickly than the other wheel.

The wheels 10L, 10R are rotatable in a rotation direction 6. In FIG. 1, the rotation direction 6, shown by a circular arrow around the rotation axis 2, is indicative of a forward direction of the assembly 1. The rotation direction 6 is an anti-clockwise direction when looking into the rotation axis 2 on a left, port side of the rotation axis 2. The wheels 10L, 10R are also rotatable in a reverse direction, which is a direction opposite to the direction of the circular arrow.

The assembly 1 comprises a steering axis 3 arranged at a mid-point between the wheels 10L, 10R. The steering axis 3 is a substantially upright axis of rotation about which the wheels 10L, 10R rotate when the assembly 1 is deployed from an aircraft taxiing on the ground. The wheels 10L, 10R are spaced apart from each other on a respective left and right side of the steering axis 3 when looking at FIG. 1. The wheels 10L, 10R are arranged to pivot about the steering axis 3 at substantially the same time. That is, the wheels 10L, 10R are rotatable fixed with respect to the steering axis 3, such that the wheels pivot about the steering axis 3 at the same time and to the same degree. In FIG. 1, a steering direction 5, shown by a circular arrow around the steering axis 3, is indicative of steering towards a port side. The steering direction 5 is an anti-clockwise direction when looking into the steering axis 3 from the top of the steering axis 3. The wheels 10L, 10R are also steerable towards a starboard side, which is a direction opposite to the direction of the circular arrow.

The assembly 1 comprises two motors 21L, 21R and two brakes 22L, 22R. Although the motors 21L, 21R and brakes 22L, 22R are shown away from the wheels 10L, 10R, it is intended that each motor 21L, 21R and brake 22L, 22R is installed in each wheel 10L, 10R. One motor 21L and brake 22L is for arrangement on a port side of the aircraft and another motor 21R and brake 22R is for arrangement on a starboard side of an aircraft and are shown on respective left and right sides of the steering axis 3 when looking at FIG. 1. The port side motor 21L and brake 22L is to be located in an internal region of the port side wheel 10L, and the starboard side motor 21R and brake 22R is to be located in an internal region of the starboard side wheel 10R.

The port side motor 21L is arranged to selectively engage and supplement rotation of the port side wheel 10L about the rotation axis 2. The starboard side motor 21R is arranged to selectively engage and supplement rotation of the starboard side wheel 10R about the rotation axis 2. The port side brake 22L is arranged to selectively engage and resist rotation of the starboard side wheel 10R about the rotation axis 2. The starboard side brake 22R is arranged to selectively engage and resist rotation of the starboard side wheel 10R about the rotation axis 2.

The assembly 1 comprises a controller 30. The controller 30 is arranged to receive a signal 31 indicating to the controller 30 about information relating to the assembly 1. In this embodiment, the information comprises information about a rotation of each wheel 10L, 10R in the same rotational direction. The signal 31 in this example comprises a signal indicative of a wheel speed. In other embodiments, the indication may be different from a wheel speed.

The controller 30 is communicable with the two motors 21L, 21R and two brakes 22L, 22R via communication lines 4. Each communication line 4 comprises an input and output represented by the input and output arrow heads. The communication lines 4 comprise electrical connections between the controller 30 and the two motors 21L, 21R and two brakes 22L, 22R. The electrical connections allow for control information to be sent to the two motors 21L, 21R and/or two brakes 22L, 22R. The electrical connections also allow for feedback information to be received from the two motors 21L, 21R and two brakes 22L, 22R. The communication lines 4 therefore carry current and/or voltage signals.

The controller 30 is arranged to cause the two motors 21L, 21R and two brakes 22L, 22R to engage their respective wheel 10L, 10R depending on which direction the wheels 10L, 10R need to turn. During a port side turning event, for example, the wheels 10L, 10R pivot about the steering axis 3 in the direction shown by arrow 5. This causes the wheels 10L, 10R to turn from right to left as shown in FIG. 1. During the port side turning event, the port side wheel 10L acts an inner wheel and the starboard side wheel 10R acts as an outer wheel.

On receipt of the signal 31 indicating that both wheels 10L, 10R are rotating in the same direction, illustrated by arrow 6 in FIG. 1, the controller 30 causes a further signal to be sent to the starboard side motor 21R and the port side brake 22L to indicate that a turning event is required. The further signal causes the motor 21R and brake 22L to simultaneously engage with their respective wheel 10R, 10L. Engagement of each motor 21L, 21R causes a rotational speed of the respective wheel to increase. Thus, during the port side turning event, engagement of the starboard side motor 21R causes the starboard side wheel 10R to speed up. Engagement of each brake 22L, 22R is to cause a rotational speed of the respective wheel to decrease. Thus, during the port side turning event, engagement of the port side brake 22L causes the port side wheel 10L to slow down. Cooperative engagement of the motors 21L, 21R and brakes 22L, 22R on opposing wheels 10L, 10R therefore results in a differential rotational speed being produced between the wheels 10L, 10R.

During a starboard side turning event, the controller 30 causes the wheels 10L, 10R to pivot about the steering axis 3 in the direction opposite to that shown by arrow 5. The wheels 10L 10R pivot because the controller 30 causes the motor 21L and brake 22R to simultaneously engage and supplement or resist rotation of their respective wheels 10L and 10R. During the starboard side turning event, the starboard side wheel 10R acts an inner wheel and the port side wheel 10L acts as an outer wheel.

Each motor 21L, 21R is capable of exerting a driving torque on the respective wheel 10L, 10R to supplement rotation of the respective wheel 10L, 10R. The driving torque causes the rotational speed of the respective wheel 10L, 10R to increase. The driving torque is additional to a driving force provided by a main propulsion device to propel an aircraft to which the assembly 1 is incorporated, such as that shown in FIGS. 3 and 4. In contrast, each brake 22L, 22R is capable of exerting a retarding torque on the respective wheel 10L, 10R to resist rotation of the respective wheel 10L, 10R. The retarding torque causes the rotational speed of the respective wheel 10L, 10R to decrease.

Figure 3:
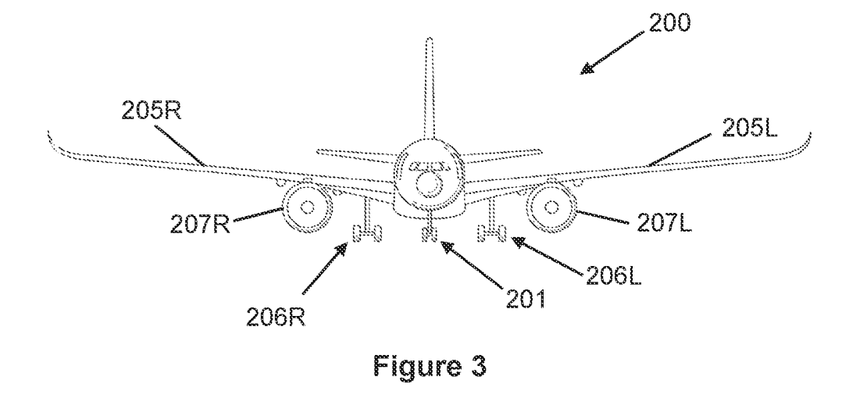
FIG. 3 shows a front view of an aircraft according to a second embodiment of the invention.
Figure 4:
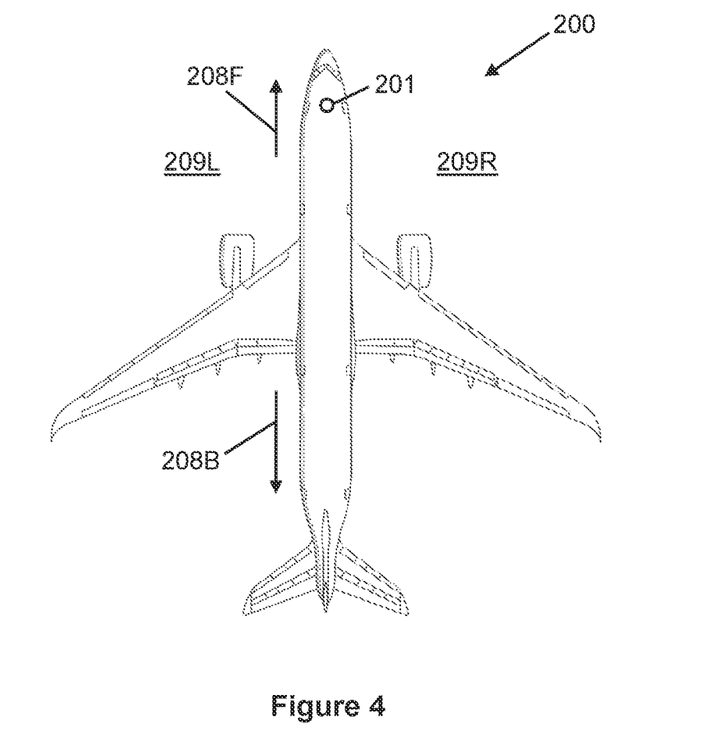
FIG. 4 shows a top view of the aircraft of FIG. 3.

Engagement of one motor 21L, 21R on one wheel 10L, 10R and one brake 22L, 22R on the other wheel 10L, 10R is to cause minimal, if any, increase in ground speed of an aircraft to which the assembly 1 is incorporated, such as that shown in FIGS. 3 and 4. In most instances, each motor 10L, 10R is rated to change a ground speed of the aircraft by no more than 5 knots when selectively engaged. Beneficially, this allows the motors 21L, 21R to be sized for only steering the wheels 10L, 10R. An impact of the motors 21L, 21R on a total weight of the assembly 1 is therefore limited to a motor suitable to only provide a steering function and not, alternatively or additionally, a propulsion function.

An amount of energy required to supplement rotation is insufficient to cause an aircraft to move at a maximum taxiing speed, typically in the range of 15 knots to 20 knots. An additional propulsion force resulting from the motor supplementing rotation is specifically arranged to steer the assembly 1 rather than to propel an aircraft. This enables the steering functionality of the aircraft for taxiing to be separate from the population system for taxiing. The motor 21L, 21R employed for supplementing rotation can therefore be sized to provide a steering function only. This helps to reduce a weight of the assembly 1.

Figure 2:
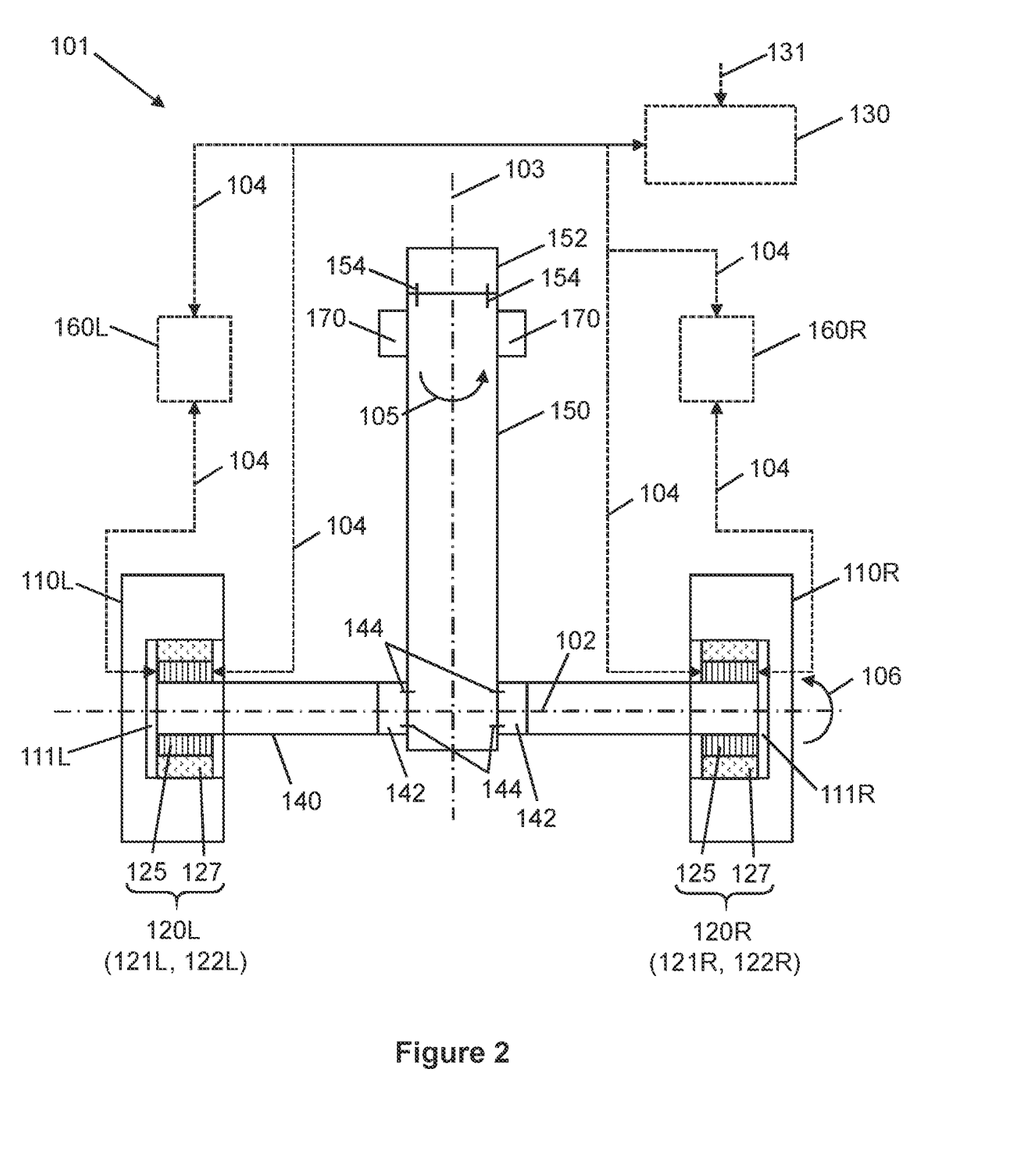
FIG. 2 shows a schematic rear view of a nose landing gear assembly according to a second embodiment of the invention.

FIG. 2 shows a schematic rear view of a nose landing gear assembly 101 for an aircraft according to a second embodiment. Common features between the first and second embodiments are incremented by 100 in FIG. 2. Only the differences between the first and second embodiments are discussed below.

The assembly 101 comprises two electromotive devices 120L, 120R, each for engaging a respective wheel 110L, 110R. The electromotive devices 120L, 120R are in-wheel devices, meaning that each electromotive device 120L, 120R is located within an internal region 111L, 111R of each respective wheel 110L, 110R.

Each electromotive device 120L, 120R comprises a stator 125 and a rotor 127. The rotor 127 is used herein to describe a passive (not energized) part of each electromotive device 120L, 120R that is moved, by an electromagnetic field of the motor 121L, 121R, or to induce current when the electromotive device 120L, 120R is operated as a generator. The stator 125 is the active (energized) part of each electromotive device 120L, 120R that generates the driving electromagnetic field in the motor 121L, 121R or in which current is induced in the generator. The relative motion between the stator 125 and the rotor 127 causes these effects. As is well known, when the rotor 127 is driven by an external means, and moved sufficiently quickly relative to its stator 125, the motor 121L, 121R will normally act as a generator of electricity. When electrical energy is supplied to the stator 125, the rotor 127 will normally move relative to the stator 125 to produce mechanical work. In view of that interchangeability of function, the term "electromotive device" is used for convenience herein, to refer interchangeably to motors and/or generators. Motors and generators are well-known and further discussion of their structure and functionality is omitted for brevity.

The wheels 110L, 110R are mounted on an axle 140 and are spaced apart from each other along the axle 140. The axle 140 comprises a rotation axis 102 about which the wheels 110L, 110R independently rotate. The axle 140 is mounted to a steering post 150. In this embodiment, the steering axis 103 is coaxial with the longitudinal axis of the steering post 150. The steering post 150 is rotatable about the steering axis 130 on a bearing 170. The steering post 150 is coupled to a torsional damper 152 to provide enhanced dynamic stability of the steering post 150. The torsional damper 152 is coupled to the steering post 150 by fasteners 154. The torsional damper 152 is coaxial with the steering post 150. In other embodiments, the torsional damper 152 may be omitted.

A torsional damper 142 is also mounted between the axle 140 and the steering post 150 to provide enhanced dynamic stability of the axle 140 about the steering post 150. The torsional damper 142 is coupled to the steering post 150 by fasteners 144. The torsional damper 142 is coaxial with the axle 140 and the rotation axis 102. In other embodiments, the torsional damper 142 may be omitted.

In this example, each electromotive device 120L, 120R is operable as a motor 121L, 121R or a brake 122L, 122R. When operated as a brake 122L, 122R, the electromotive device 120L, 120R functions as a generator, as described above. This allows the brake 122L, 122R to recover energy normally lost under braking. Electrical energy generated under braking is optionally stored in an energy storage 160L, 160R, which, in this example, is as a battery but can be a capacitor, for example. This allows energy recovered from one steering event to be used in the same or a subsequent steering event or even for other devices requiring electrical energy. Electrical energy is transferred between the controller 130, the electromotive device 120L, 120R, and optionally the energy storage 160L, 160R via the communication lines 104.

The electromotive devices 120L, 120R are sized to provide no more than the required energy to pivot the wheels 110L, 110R about the steering axis 103. Beneficially, when an aircraft, in which the assembly 101 is incorporated, is propelled during a ground manoeuvre—that is, when the aircraft is taxiing—a main propulsion system of the aircraft is not required to adjust to provide sufficient power to steer the aircraft. This enables the main propulsion system to stay within an efficient operating range. The impact (for example, a volume and weight) of the equipment required to provide a steering function can also be minimised by separating the steering and propulsion functions. This effect is enhanced when one of the electromotive devices 120L, 120R is used as a regenerative brake and energy recovered in that process can be supplied to the other one of the electromotive devices 120L, 120R for use in supplementing rotation of the respective wheel 110L, 110R.

As described in relation to the assembly 1 of the first embodiment, the controller 130 of the assembly 101 of the second embodiment is arranged to cause the two motors 121L, 121R and two brakes 122L, 122R to engage their respective wheel 110L, 110R depending on which direction the wheels 110L, 110R need to turn. In the second embodiment, the controller 130 selectively operates one of the electromotive devices 120L, 120R as the motor 121L, 121R and the other one as the brake 122L, 122R. During a port side turning event, for example, the wheels 110L, 110R pivot about the steering axis 103 in the direction shown by arrow 105. This causes the wheels 110L, 110R to turn from right to left as shown in FIG. 2. During the port side turning event, the port side wheel 110L acts an inner wheel and the starboard side wheel 110R acts as an outer wheel. In contrast, during a starboard side turning event, the starboard side wheel 110R acts an inner wheel and the port side wheel 110L acts as an outer wheel.

On receipt of a signal 131 indicating that both wheels 110L, 110R are rotating in the same direction, illustrated by arrow 106 in FIG. 2, the controller 130 causes a further signal to be sent along the communication lines 4 to electromotive devices 120L, 120R to indicate that a turning event is required. The controller 130 causes the starboard side electromotive device 120R to operate as a motor 121R and the port side electromotive device 120R to operate as a brake 122L. The causes the motor 121R and brake 122L to simultaneously engage with their respective wheel 110R, 110L. Engagement of the motor 121R causes a rotational speed of the starboard side wheel 110R to increase. Engagement of the brake 122L causes a rotational speed of the port side wheel 110L to decrease. The engagement causes the wheels 110L, 110R to pivot about the steering axis 103 from right to left when looking at FIG. 2.

During application of the respective brake 122L, 122R electrical energy is generated by slowing down the wheel 110L, 110R. Energy recovered in the form of electrical energy can be used by the motor 121L, 121R acting on the opposing wheel 110L, 110R. This allows the energy required to supplement rotation of the opposing wheel 110L, 110R to be provided by the energy recovered from the brake 122L, 122R. A power rating of the electromotive devices 120L, 120R can be sized based on the input of electrical energy during regenerative braking of an opposing electromotive device 120L, 120R. This helps to reduce the impact (for example, the volume and weight) of the electromotive device 120L, 120R compared to instances when regenerative braking is mot utilised. In other embodiments, a resistor may be used to dissipate energy during braking.

FIGS. 3 and 4 show an aircraft 200 having two wings 205L, 205R, each wing having a main landing gear 206L, 206R mounted thereon. The aircraft 200 comprises a nose landing gear 201 mounted on the fuselage of the aircraft 200. The nose landing gear 201 of FIGS. 3 and 4 may comprise the nose landing gear assembly 1, 101 according to the first or second embodiment. The aircraft 200 comprises a main propulsion system comprising an engine 206L, 206R mounted on each wing 205L, 205R. In this embodiment, the engines 206L, 206R are combustion engines. In other embodiments, the main propulsion system may comprise one or more electric motors capable of generating the thrust necessary for powering the aircraft 200 in-flight. In other embodiments, the main propulsion system may comprise a combination of combustion engines and electric motors suitable for hybrid-electric propulsion of the aircraft 200 in-flight.

The main propulsion system is for propelling the aircraft 200 in-flight and when taxiing on the ground for example in a forward direction 208F using forward thrust or in a reverse direction 208B using reverse thrust. To steer the aircraft 200 in a port side 209L direction, wheels of the nose landing gear 201 rotate about the steering axis of the nose landing gear 201 in an anti-clockwise direction when looking at FIG. 4 by engagement of the motor on the starboard side nosewheel and the brake on the port side nosewheel. In contrast, to steer the aircraft 200 in a starboard side 209R direction, the wheels of the nose landing gear 201 rotate about the steering axis of the nose landing gear 201 in a clockwise direction when looking at FIG. 4 by engagement of the motor on the port side nosewheel and the brake on the starboard side nosewheel. When the aircraft 200 turns, the aircraft 200 turns about an axis that is different to the steering axis of the nose landing gear 201.

The aircraft 200 is configured such that the main propulsion system provides an amount of energy required for taxiing the aircraft 200, whereas the motor and brake of the nose landing gear assembly 1, 101 provides an amount of energy required to steer the aircraft 200. Advantageously, the main propulsion system is operable under more steady-state conditions when steering the aircraft 200, rather than more transient conditions associated when steering by differential thrust. This may help to minimise cyclically loading the main propulsion system when taxing.

When selectively engaged, the motors of the nose landing gear 201 may provide marginal impact on a speed of the aircraft 200. This is because the motors are not suitable for propelling the aircraft 200 at nominal taxiing speeds. That is, each motor is rated to change a ground speed of the aircraft 200 by no more than 5 knots when selectively engaged. The motors are separate from the main prolusion device of the aircraft 200. This allows smaller motors to be used as opposed to motors that are required to be sized for driving the aircraft 200 at taxiing speeds, for example.

Figure 5:
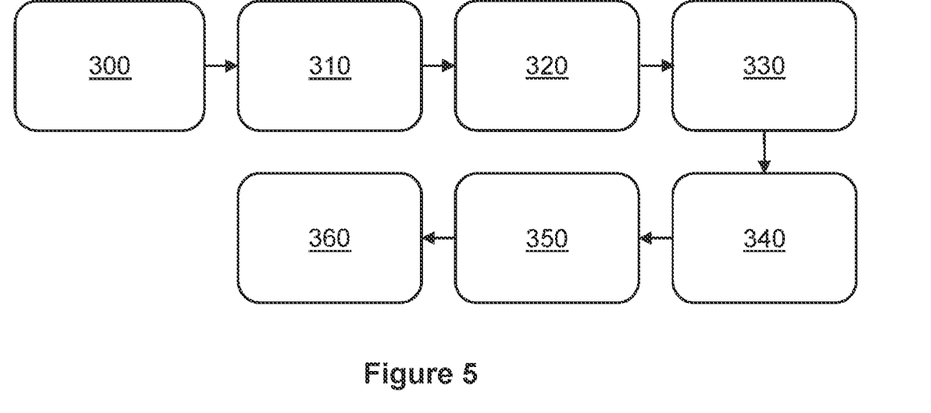
FIG. 5 shows an example method in accordance with the invention.

FIG. 5 shows a method of operating a nose landing gear assembly, for example using the nose landing gear assembly 1 according to the first embodiment. A ground manoeuvre 300 causes a port side and starboard side wheel to be rotated 310. A motor is engaged 320 with one of the wheels and rotation of that wheel is supplemented 330 by the motor. A brake is engaged 340 with the other wheel and rotation of the wheel is resisted 350 by the brake. Engagement of the motor and brake with the respective wheels to supplement and resist rotation of the respective wheel causes the wheels to be pivoted 360 about a steering axis in the same direction.

Optionally, when rotation of the wheel is supplemented 330 by the motor, at least a portion of an energy output of the motor by a controller comprises an energy input recovered by the brake that resisted the rotation of the other wheel. An example controller is one described in relation to the first or second embodiment above. Optionally, the wheels are rotated 310 by an energy input that exceeds a maximum energy output of the motor.

Whilst the present invention has been described and illustrated with reference to particular embodiments, it will be appreciated by those of ordinary skill in the art that the invention lends itself to many different variations not specifically illustrated herein.

Although steering under a forward or reverse movement is described in relation to the above embodiments, the wheels 10L, 10R, 110L, 110R can be steered without such movement. In that instance, both motors 21L, 21R, 121L, 121R are engaged to rotate the wheels 10L, 10R, 110L, 110R in the same direction at the same time. Both motors 21L, 21R, 121L, 121R then drive the wheels 10L, 10R, 110L, 110R without further energy from a separate energy source rather than supplementing rotation of the wheels 10L, 10R, 110L, 110R.

In the above embodiments, the motors 21L, 21R, 121L, 122R and brakes 22L, 22R, 122L, 122R are described in an engaged state. For the avoidance of doubt, it should be understood that the motors 21L, 21R, 121L, 122R and brakes 22L, 22R, 122L, 122R can be selectively disengaged from the respective wheel. When the motors 21L, 21R, 121L, 122R and brakes 22L, 22R, 122L, 122R are disengaged, the wheels 10L, 10R, 110L, 110R can be free to caster. That is, the motors 21L, 21R, 121L, 122R and brakes do not resist pivoting movement about the steering axis 3, 103. Beneficially, the wheels 10L, 10R, 110L, 110R are provided with an inherent free caster capability. In the embodiments described above, a clutch or gearbox between the wheel and the motors may not be required.

In the above embodiments, the controller 30, 130 is configured to cause the wheels 10L, 10R, 110L, 110R to pivot about the steering axis 3, 103 such that a required slip angle is generated. The controller 30, 130 may receive an input informing the controller 30, 130 about a slip angle and a limit of slip angle dependent on a ground speed of the aircraft in which the assembly 1, 101 is incorporated. Engagement of the motors 21L, 21R, 121L, 122R and brakes 22L, 22R, 122L, 122R can be adjusted by the controller 130 depending on a current or desired slip angle.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. An aircraft nose landing gear assembly, comprising:
   two wheels being a first wheel and a second wheel, the two wheels being separated by a steering axis and each being independently rotatable about a rotation axis in a rotation direction;
   a first electromotive device associated with the first wheel, the first electromotive device being configured to selectively engage and supplement rotation of the first wheel in the rotation direction, and to selectively engage and resist rotation of the first wheel in the rotation direction;
   a second electromotive device associated with the second wheel, the second electromotive device being configured to selectively engage and supplement rotation of the second wheel in the rotation direction, and to selectively engage and resist rotation of the second wheel in the rotation direction;
   a controller arranged to, during a turning event, based on an indication to the controller of rotation of the two wheels in the rotation direction, cause the first electromotive device to engage the first wheel and supplement rotation, and the second electromotive device to engage the second wheel and resist rotation, such that said engagement of the electromotive devices causes the two wheels to pivot about the steering axis;
   wherein the aircraft comprises one or more propulsion systems separate from the nose landing gear which are arranged to propel the aircraft along the ground when taxiing and capable of causing the aircraft to taxi along flat and level ground in a manner that would maintain a speed greater than or equal to the typical taxiing speed;
   wherein each of the first and second electromotive devices is selectively and independently operable by the controller to selectively either function as a motor to supplement rotation or as a brake to resist rotation of the respective wheel of the nose landing gear.

2. The aircraft nose landing gear assembly according to claim 1, wherein the controller is arranged to cause at least a portion of an energy demand by one of the first and second electromotive devices when functioning as a motor to be provided by energy recovered by the other of the first and second electromotive devices when functioning as a brake.

3. The aircraft nose landing gear assembly according to claim 2, wherein the controller is arranged to cause most of the energy demand to be provided by the energy recovered.

4. The aircraft nose landing gear assembly according to claim 2, wherein the controller is arranged to cause the energy demand to be provided by the energy recovered during the same turning event.

5. The aircraft nose landing gear assembly according to claim 2, comprising an energy storage to store the energy recovered as stored energy, wherein the controller is arranged to cause the energy demand during the turning event or a subsequent turning event to be provided by the stored energy.

6. The aircraft according to claim 1, wherein the aircraft has a maximum take-off weight of at least 10,000 kg and the two motors arranged to selectively engage and supplement rotation of a respective wheel of the nose landing gear have a combined maximum power output which is insufficient to cause the aircraft to taxi along flat and level ground in a manner that would maintain a typical taxiing speed, the typical taxiing speed being a speed in the range of 10 to 20 knots.

7. The aircraft according to claim 1, wherein the first and the second electromotive devices are so arranged that, during the turning event, the motor supplementing the rotation of one wheel uses energy recovered from the brake associated with the other wheel.

8. An aircraft comprising the aircraft nose landing gear assembly according to claim 1.

9. The aircraft according to claim 8, wherein each of the two electromotive devices is rated to change a ground speed of the aircraft by no more than 5 knots when selectively engaged.

10. The aircraft according to claim 8, further comprising: wherein the controller is arranged to cause a maximum energy demand by each of the two electromotive devices to supplement rotation of the wheel corresponding to the motor to be less than an amount of energy required to propel the aircraft by the main propulsion system when taxiing.

11. The aircraft according to claim 8, wherein the aircraft has a maximum take-off weight of at least 10,000 kg and the two electromotive devices arranged to selectively engage and supplement rotation of a respective wheel of the nose landing gear have a combined maximum power output which is insufficient to cause the aircraft to taxi along flat and level ground in a manner that would maintain a typical taxiing speed, the typical taxiing speed being a speed in the range of 10 to 20 knots.

12. The aircraft nose landing gear assembly according to claim 1, wherein the combined maximum power output of the motors of the nose landing gear assembly is less than 20% of the maximum power needed by said one or more main propulsion systems to cause the aircraft to taxi along the ground at a threshold taxiing speed of 20 knots.

13. A method of operating an aircraft nose landing gear assembly comprising a port side wheel and a starboard side wheel separated by a steering axis and each independently rotatable about a rotation axis in a rotation direction, the aircraft comprising a main propulsion system having at least one engine, the method comprising:
using the at least one engine to propel the aircraft when taxiing,
during a turning event, while a port side wheel and a starboard side wheel rotating in a same direction as a result of the aircraft being propelled by at least one engine, supplementing rotation of one of the port side and starboard side wheels by engaging a first electromotive device with said one of the port side and starboard side wheels, and resisting rotation of the other wheel of the port side and starboard side wheels by a second electromotive device engaged with said other wheel, the supplementing rotation of the one wheel and the resisting rotation of the other wheel causing said port side and starboard side wheels to pivot about a steering axis,
wherein each of the first and second electromotive devices is selectively and independently operable to selectively either function as a motor to supplement rotation or as a brake to resist rotation of the respective wheel of the nose landing gear.

14. The method according to claim 13, wherein at least a portion of an energy demand by the motor that supplements the rotation of the one wheel comprises an energy recovered by the first or the second electromotive device resisting the rotation of the other wheel.

15. The method according to claim 13, wherein the port side and starboard side wheels are rotated by an energy demand exceeding a maximum energy demand by the first or the second electromotive device.

16. The method according to claim 13, wherein during the turning event the supplementing rotation of the one wheel and the resisting rotation of the other wheel are both performed at the same time as said one or more main propulsion systems are providing the force that causes rotation of the wheels in the same direction while taxiing.

17. The method according to claim 16, wherein said one or more main propulsion systems are also provided for propelling the aircraft when in-flight.

* * * * *